United States Patent
Xu et al.

(10) Patent No.: US 12,240,345 B1
(45) Date of Patent: Mar. 4, 2025

(54) FAST CHARGING CAPABLE MIXED CHEMISTRY BATTERY SYSTEMS

(71) Applicant: GM Global Technology Operations LLC, Detroit, MI (US)

(72) Inventors: Shuonan Xu, Troy, MI (US); Hanho Yun, Oakland Township, MI (US); Lei Hao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/446,569

(22) Filed: Aug. 9, 2023

(51) Int. Cl.
| | |
|---|---|
| *B60L 53/22* | (2019.01) |
| *B60L 58/18* | (2019.01) |
| *H01M 10/44* | (2006.01) |
| *H01M 10/46* | (2006.01) |
| *H02M 3/158* | (2006.01) |

(52) U.S. Cl.
CPC ............ *B60L 53/22* (2019.02); *B60L 58/18* (2019.02); *H01M 10/441* (2013.01); *H01M 10/46* (2013.01); *H02M 3/158* (2013.01); *B60L 2210/12* (2013.01); *B60L 2210/14* (2013.01); *H01M 2220/20* (2013.01)

(58) Field of Classification Search
CPC ...... B60L 53/22; B60L 58/18; B60L 2210/12; B60L 2210/14; H01M 10/44; H01M 10/441; H01M 10/46; H01M 2220/20; H02M 3/158
See application file for complete search history.

(56) References Cited

U.S. PATENT DOCUMENTS

| | | | |
|---|---|---|---|
| 2009/0103341 A1 | 4/2009 | Lee et al. | |
| 2012/0038214 A1* | 2/2012 | King | B60L 58/20 307/77 |
| 2018/0361861 A1 | 12/2018 | Bando | |

OTHER PUBLICATIONS

German Office Action for German Application No. 102023128167.4; dated Jan. 3, 2024; 6 pages.

* cited by examiner

*Primary Examiner* — Robert L Deberadinis
(74) *Attorney, Agent, or Firm* — CANTOR COLBURN LLP (57) ABSTRACT

A system for controlling power transfer includes a direct current (DC)-DC converter connected to a charging bus and selectively connected to a propulsion battery assembly and a supplemental battery assembly, the propulsion battery assembly having a first chemistry and configured to supply power to an electric motor of a vehicle, the supplemental battery assembly having a second chemistry that is different than the first chemistry. The system also includes a charger connected to the charging bus at a first side of the DC-DC converter, the charging bus connected to a load at a second side of the DC-DC converter, and a controller configured to control the DC-DC converter to perform a charging operation.

20 Claims, 5 Drawing Sheets

FAST CHARGING CAPABLE MIXED CHEMISTRY BATTERY SYSTEMS

INTRODUCTION

The subject disclosure relates to energy or power storage and transfer, and more particularly to systems including multiple battery chemistries and methods for controlling operation of multi-chemistry energy storage systems.

Vehicles, including gasoline and diesel powered vehicles, as well as electric and hybrid electric vehicles, feature battery storage for purposes such as powering electric motors, electronics and other vehicle subsystems. Battery systems provide power to various loads, including electric motors for propulsion, and accessories and components such as power control modules, heaters and cooling systems. Various charging systems are provided for supplying electrical charge to battery systems. It is desirable to provide systems that can improve charging performance of such systems, including fast charging.

SUMMARY

In one exemplary embodiment, a system for controlling power transfer includes a direct current (DC)-DC converter connected to a charging bus and selectively connected to a propulsion battery assembly and a supplemental battery assembly, the propulsion battery assembly having a first chemistry and configured to supply power to an electric motor of a vehicle, the supplemental battery assembly having a second chemistry that is different than the first chemistry. The system also includes a charger connected to the charging bus at a first side of the DC-DC converter, the charging bus connected to a load at a second side of the DC-DC converter, and a controller configured to control the DC-DC converter to perform a charging operation.

In addition to one or more of the features described herein, the DC-DC converter is a bi-directional buck-boost converter.

In addition to one or more of the features described herein, the propulsion battery assembly and the supplemental battery assembly are connected to the charging bus at opposing sides of the DC-DC converter.

In addition to one or more of the features described herein, the supplemental battery assembly is a high energy battery assembly having an energy density that is greater than an energy density of the propulsion battery assembly.

In addition to one or more of the features described herein, the system includes a switching system controllable by the controller to put the system into a charging mode.

In addition to one or more of the features described herein, the switching system includes a first switch disposed between the propulsion battery assembly and the charging bus, and a second switch disposed between the supplemental battery assembly and the charging bus.

In addition to one or more of the features described herein, the controller is configured to put the system into a first charging mode by closing the first switch and opening the second switch, the first charging mode causing a charging current to bypass the supplemental battery assembly and charge the propulsion battery assembly through the DC-DC converter.

In addition to one or more of the features described herein, the controller is configured to put the system into a second charging mode by closing the first switch and closing the second switch, the second charging mode causing a charging current to charge the supplemental battery assembly and the propulsion battery assembly simultaneously.

In addition to one or more of the features described herein, the controller is configured to connect the supplemental battery assembly in parallel to the propulsion battery assembly during vehicle propulsion, and provide an electrical charge to the propulsion battery assembly through the DC-DC converter to extend a range of the vehicle.

In addition to one or more of the features described herein, the controller is configured to connect the supplemental battery assembly in parallel to the propulsion battery assembly during vehicle propulsion, and provide electrical power to the electric motor through the DC-DC converter, the electrical power bypassing the propulsion battery assembly.

In another exemplary embodiment, a method of controlling power transfer includes receiving a charging request at a controller of a charging system, the charging system including a DC-DC converter connected to a charging bus and selectively connected to a propulsion battery assembly and a supplemental battery assembly, and performing a charging operation based on the charging request by controlling a DC-DC converter. The propulsion battery assembly has a first chemistry and is configured to supply power to an electric motor of a vehicle, the supplemental battery assembly has a second chemistry that is different than the first chemistry, the charging system includes a charger connected to the charging bus at a first side of the DC-DC converter, and the charging bus is connected to a load at a second side of the DC-DC converter.

In addition to one or more of the features described herein, the DC-DC converter is a bi-directional buck-boost converter.

In addition to one or more of the features described herein, the charging system includes a switching system controllable by the controller to put the charging system into a charging mode.

In addition to one or more of the features described herein, the switching system includes a first switch disposed between the propulsion battery assembly and the charging bus, and a second switch disposed between the supplemental battery assembly and the charging bus.

In addition to one or more of the features described herein, performing the charging operation includes putting the charging system into a first charging mode by closing the first switch and opening the second switch, the first charging mode causing a charging current to bypass the supplemental battery assembly and charge the propulsion battery assembly through the DC-DC converter.

In addition to one or more of the features described herein, performing the charging operation includes putting the charging system into a second charging mode by closing the first switch and closing the second switch, the second charging mode causing a charging current to charge the supplemental battery assembly and the propulsion battery assembly simultaneously.

In yet another exemplary embodiment, a vehicle system includes a DC-DC converter connected to a charging bus and selectively connected to a propulsion battery assembly and a supplemental battery assembly, the propulsion battery assembly having a first chemistry and configured to supply power to an electric motor of a vehicle, the supplemental battery assembly having a second chemistry that is different than the first chemistry. The vehicle system also includes a charger connected to the charging bus at a first side of the DC-DC converter, the charging bus connected to a load at a second side of the DC-DC converter, and a controller configured to control the DC-DC converter to perform a charging operation.

In addition to one or more of the features described herein, the supplemental battery assembly is a high energy battery assembly having an energy density that is greater than an energy density of the propulsion battery assembly.

In addition to one or more of the features described herein, the vehicle system includes a switching system controllable by the controller to put the vehicle system into a charging mode, the switching system including a first switch disposed between the propulsion battery assembly and the charging bus, and a second switch disposed between the supplemental battery assembly and the charging bus.

In addition to one or more of the features described herein, the controller is configured to put the system into a first charging mode by closing the first switch and opening the second switch, the first charging mode causing a charging current to bypass the supplemental battery assembly and charge the propulsion battery assembly through the DC-DC converter, and the controller is configured to put the system into a second charging mode by closing the first switch and closing the second switch, the second charging mode causing a charging current to charge the supplemental battery assembly and the propulsion battery assembly simultaneously.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with exemplary embodiments, methods, devices and systems are provided for energy storage and/or energy transfer using battery systems having multiple chemistries. An embodiment of a mixed chemistry battery system of a vehicle includes a propulsion battery system having a first chemistry (e.g., lithium iron phosphate or LFP) and a supplemental battery system having a second chemistry. For example, the supplemental battery system includes a high energy density (as compared to the propulsion battery system) battery assembly, such as a lithium metal battery (LMB) chemistry. The supplemental battery system is selectively connected in parallel to the propulsion battery system, and is operable to perform functions such as providing additional power to a vehicle propulsion system and extending vehicle range.

An embodiment of a charging system includes a direct current (DC)-DC converter connected to a charging bus. The propulsion battery system includes a battery assembly such as propulsion battery pack selectively connected to the charging bus, and the supplemental battery system includes a battery assembly such as a supplemental battery pack selectively connected to the charging bus. In an embodiment, the propulsion battery pack (or other propulsion battery assembly, such as multiple series-connected battery packs) and the supplemental battery pack are connected at opposing sides of the DC-DC converter.

The charging system includes or is connected to a charger, which is part of or connected to a charge port. The charging system is also connected to one or more loads, such as an electric motor, power electronics and any other devices or components powered by the mixed chemistry battery system. For example, the charging bus is connected to a propulsion bus for supplying power to an electric motor of a vehicle.

In an embodiment, the charger and the one or more loads are connected to the charging bus at opposing sides of the DC-DC converter. For example, the DC-DC converter is connected to the charging bus between the charger and the propulsion bus.

Embodiments also include systems and methods for controlling charging of components of a mixed chemistry battery system. In an embodiment, a system includes a controller configured to control a charging process. The controller may put the charging system into various charging modes.

Embodiments described herein present numerous advantages and technical effects. For example, embodiments provide for effective use of advanced and high energy density batteries to supplement existing battery storage and improve vehicle performance and range. The embodiments utilize the benefits of different chemistries to improve overall performance.

Embodiments also provide for improvements in charging efficiency and charging rate in mixed chemistry battery systems. For example, an existing charging system configuration for a mixed chemistry battery system includes a charging bus that connects a supplemental battery system in parallel with a propulsion battery system. The supplemental battery system has a greater energy density than the propulsion battery system and has a fast charging rate, but the charging rate is limited by the power rating of the DC-DC converter. By configuring the charging system as described herein, the charging rate of the supplemental battery system is no longer limited by the DC-DC converter. Thus, the supplemental battery system can be charged more quickly than existing systems.

The embodiments are not limited to use with any specific vehicle and may be applicable to various contexts. For example, embodiments may be used with automobiles, trucks, aircraft, construction equipment, farm equipment, automated factory equipment and/or any other device or system for which additional thermal control may be desired to facilitate a device or system's existing thermal control capabilities or features.

Figure 1:
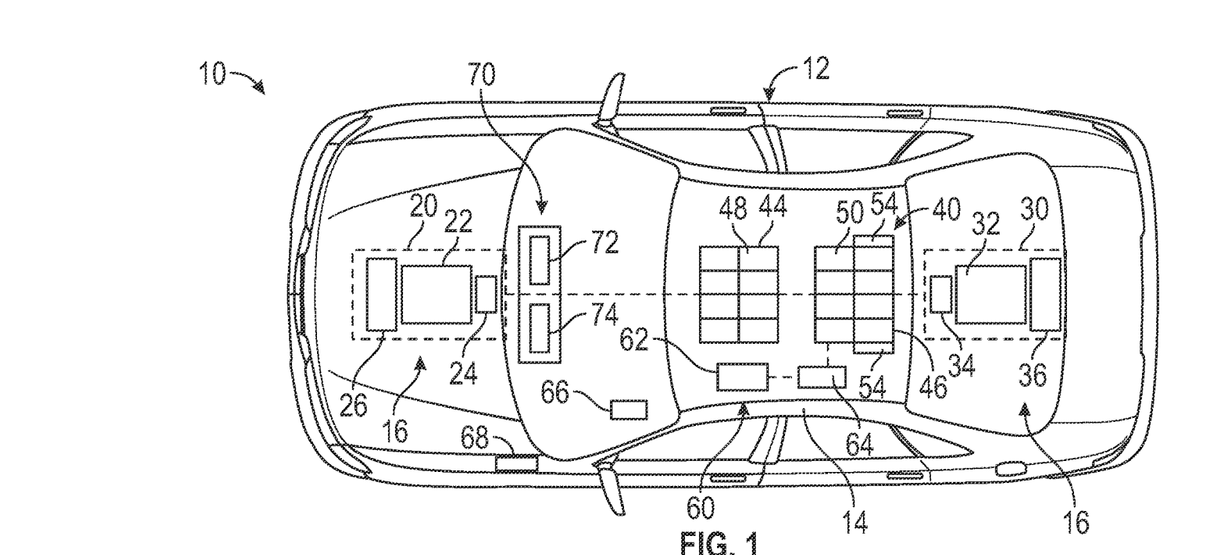
FIG. 1 is a top view of a motor vehicle including a mixed chemistry battery system that includes battery assemblies having different chemistries, in accordance with an exemplary embodiment.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and if the vehicle is a hybrid electric vehicle, a fuel injection subsystem, an exhaust subsystem and others.

The vehicle 10 may be an electrically powered vehicle (EV), a hybrid vehicle or any other vehicle. In an embodiment, the vehicle 10 is an electric vehicle, which includes one or more motors and one or more drive systems. For example, the propulsion system 16 is a multi-drive system that includes a first drive unit 20 and a second drive unit 30.

The first drive unit 20 includes a first electric motor 22 and a first inverter 24, as well as other components such as a cooling system 26. The second drive unit 30 includes a second electric motor 32 and a second inverter 34, and other components such as a cooling system 36. The inverters 24 and 34 (e.g., traction power inverter units or TPIMs) each convert direct current (DC) power from a high voltage (HV) battery system to poly-phase (e.g., two-phase, three-phase, six-phase, etc.) alternating current (AC) power to drive the motors 22 and 32.

In the propulsion system 16, the drive unit 20 and the drive unit 30 are electrically connected to a mixed chemistry battery system 40. The battery system 40 or components thereof may be configured as a rechargeable energy storage system (RESS).

The mixed chemistry battery system 40 includes one or more battery assemblies. For example, the battery system 40 includes one or more high voltage battery packs, such as a first battery pack 44 connected to the inverter 24, and a second battery pack 46 connected to the inverter 34. The battery packs 44 and 46 (and associated components such as a RESS or battery management system (BMS) controller) are a primary source of power to the propulsion system 16, and are referred to as a propulsion battery system.

The battery pack 44 includes a plurality of battery modules 48, and the battery pack 46 includes a plurality of battery modules 50. Each module 48, 50 includes a number of individual cells (not shown). In an embodiment, the battery packs 44 and 46 can be independently charged and can be used to independently supply power for propulsion, power supply and/or charging.

Each battery module 48, 50 includes a plurality of cells (not shown) having a selected chemistry. In an embodiment, each cell is a lithium-ion battery, such as a lithium ferrophosphate (LFP) battery. The battery packs 44 and 46 are not so limited and can have any suitable chemistry. Other examples include nickel-metal hydride and lead acid chemistries.

The vehicle 10 includes a number of additional battery assemblies (e.g., one or more additional cells, modules, packs etc.). In an embodiment, the mixed chemistry battery system 40 includes a supplemental battery system 60 that is connected or selectively connectable in parallel to the battery packs 44 and 46. The supplemental battery system 60 is provided to supplement the battery packs 44 and 46, for example, by providing additional power to the propulsion system 16 and/or providing energy to the battery pack 44 and/or 46 to increase the range of the vehicle 10. The supplemental battery system 60 includes at least one supplemental battery pack 62, which may have the same voltage rating as the battery packs 44 and 46 (e.g., 400V) but is not so limited.

The supplemental battery pack 62 is connected to the battery system 40 via a conversion device, such as a DC-DC converter 64. Control of the DC-DC converter 64 and/or the supplemental battery system 60 can be performed using any suitable processing device or processor, such as a battery management system (BMS) controller or other controller associated with the battery packs 44 and 46, a charging controller, a motor controller or others.

The supplemental battery system 60, in an embodiment, is a high energy density system (i.e., has a higher energy density than the battery packs 44 and 46). For example, the battery pack 62 includes a plurality of high energy density cells. Such cells have high energy density chemistries, such as Lithium-metal cells (e.g., LMB cells), Si-anode cells (lithium ion cells having silicon-based anodes) and others.

Use of mixed chemistries as described herein provide for increased performance. For example, lithium-based battery cells such as LFP cells are low in cost and have a relatively high cycle life, but have a relatively low energy density and are affected by low temperatures. Lithium-metal cells such as NCM cells, or other advanced battery chemistries, have relatively high energy densities but typically have shorter life cycles and lower charging rates as compared to typical propulsion battery chemistries. Combining battery chemistries improve the overall energy density, cycle life and charging performance.

In an embodiment, the vehicle 10 includes one or more additional cells 54 that are connected in series to the cells of the battery pack 46 and/or the battery pack 44. Although the cells 54 are shown as connected to the battery pack 46, one or more cells 54 may also be connected in series with the battery pack 44. It is noted that embodiments are not limited to the number or configuration of cells 54 shown in FIG. 1.

In an embodiment, the cells 54 have a battery chemistry that is different than the chemistry of the battery pack 44 and/or 46. For example, the cells 54 are NCM cells and the battery packs 44 and 46 have a lithium-ion chemistry, such as LFP.

The cells 54 may have various uses and functions. The cells 54 provide improvements in low temperature performance, and may be used as "virtual sensors" to facilitate estimation of the SOC of the battery pack 46. SOC estimation may be performed by estimating an SOC of the cells 54, and estimating the SOC of the battery pack 46, via known techniques such as coulomb counting. The estimates are combined to reduce the error of an estimation of SOC of the battery pack 46 (e.g., to 3% or less). Such estimates can be used during a charging process to monitor progress.

The vehicle 10 also includes a charging system, which can be used to charge the battery packs 44 and 46 (and cells 54), charge the supplemental battery system 60 and/or to supply power to charge another energy storage system (e.g., vehicle-to-vehicle (V2V) and/or vehicle-to-everything (V2X) charging). The charging system includes one or more conversion devices for controlling aspects of charging and/or discharging. For example, at least one conversion device provides for conversion between AC current and DC current and/or voltage control. The conversion device may be a bi-directional conversion device that allows a charge port to be used for either charging or discharging.

In an embodiment, the charging system includes a charging control device 66 or charger 66, such as an onboard charging module (OBCM). The charging control device 66 includes a conversion device in the form of a charger (charge circuit) that includes devices for alternating current (AC)-DC conversion and DC-DC conversion. For example, the charging control device 66 permits both charging and discharging to and from an external power storage device, such as the battery system of another vehicle (V2V charging). The charging control device 66 connects the battery system 40 to a charge port 68 for charging vehicle battery systems and/or providing charge to external storage systems.

The vehicle 10 also includes a computer system 70 that includes one or more processing devices 72 and a user interface 74. The various processing devices and units may communicate with one another via a communication device or system, such as a controller area network (CAN) or transmission control protocol (TCP) bus.

Figure 2:
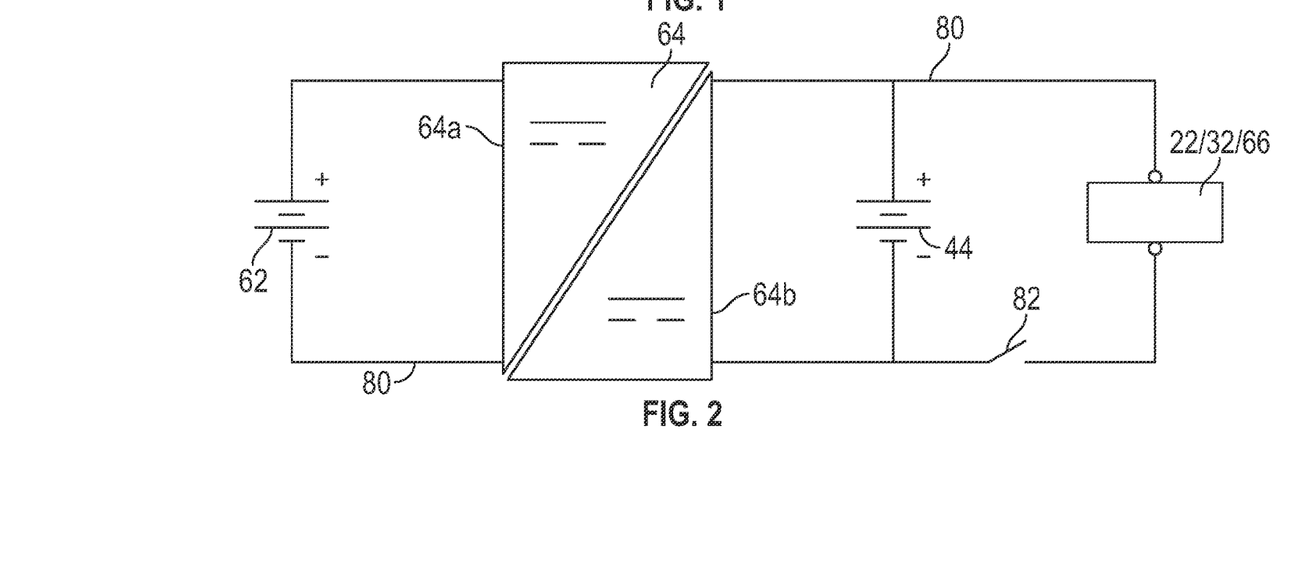
FIG. 2 depicts a charging system connected to battery assemblies of a mixed chemistry battery system.

FIG. 2 depicts an example of a configuration of the charging system and the battery system 40. As shown, the DC-DC converter 64 is connected to a charging bus 80. The DC-DC converter 64 may be a bidirectional buck-or-boost converter or a bidirectional buck-and-boost converter.

The battery pack 44 (also referred to herein as a "propulsion pack" 44) and the supplemental battery pack 62 (also referred to herein as an "energy pack" 62) are connected in parallel to the charging bus 80. The packs may be selectively connectable to the charging bus 80 via various switching devices (not shown). A main negative switch 82 at a negative side of the charging bus 80 may be included to connect and disconnect the battery packs and the charging system to the charger 66 and motors 22 and 32 (as well as other loads such as a cooling, system, power electronics, etc.).

Although only the battery pack 44 is shown, the configuration is not so limited, as any type and number of propulsion battery packs can be connected. For example, the series-connected battery packs 44 and 46 may be connected to the charging bus 80. The battery pack 44 may thus represent any number of series-connected battery assemblies. Likewise, the energy pack 62 may represent any number of series-connected battery assemblies.

In the configuration of FIG. 2, the various loads and the charger 66 are connectable to the charging bus 80 at the same side of the DC-DC converter 64. Specifically, the DC-DC converter 64 has one end 64a connected to the bus 80 and the energy pack 62, and an opposing end 64b connected to the bus 80, the propulsion pack 44 and loads.

The configuration of FIG. 2 may have limitations. For example, although the energy pack 62 can be charged with a high charging rate, the charging rate that can be applied to the energy pack 62 is limited by characteristics of the DC-DC converter 64.

Figure 3:
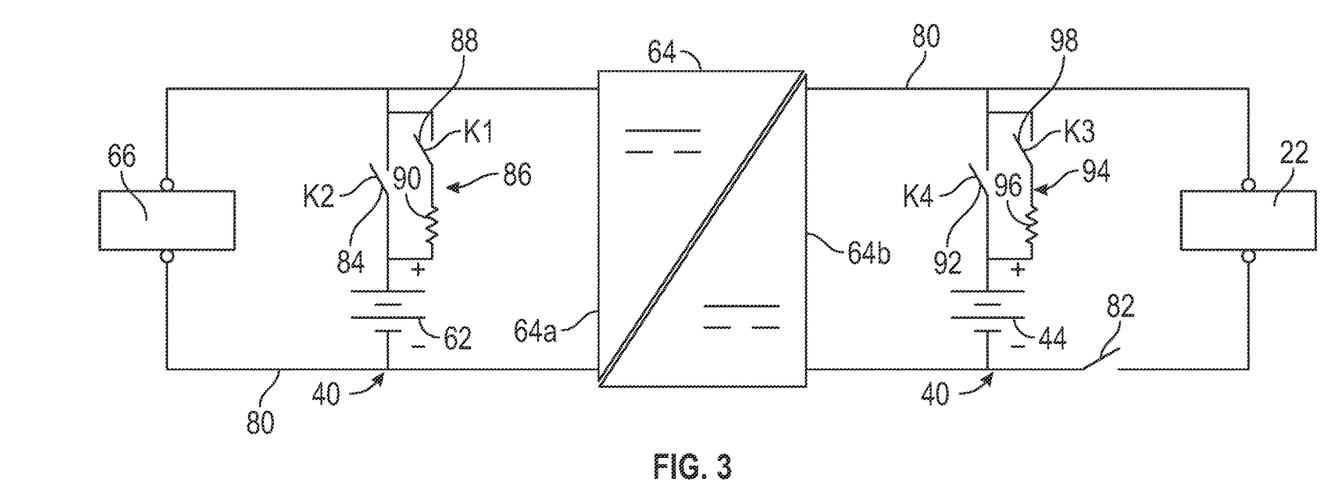
FIG. 3 depicts a charging system connected to battery assemblies of a mixed chemistry battery system, in accordance with an exemplary embodiment.

FIG. 3 depicts an embodiment of a charging system, which overcomes the above-mentioned limitation. In this embodiment, the charger 66 and the loads are connected to the charging bus 80 at opposing sides of the DC-DC converter 64.

For example, as shown in FIG. 3, the charger 66 is connected to the charging bus 80 at one side of the DC-DC converter 64 (i.e., a side of the charging bus 80 connected to the end 64a). The motor 22 (and other loads such as the inverter 24 and the cooling system 26) is connected to an opposing side of the DC-DC converter 64 (i.e., a side of the charging bus 80 connected to the end 64b).

The charging system includes other components for performing various functions related to supplying power to loads, transferring power between the packs 62 and 44, and facilitating transfer of charge to the pack 62 and/or the pack 44 via the charger 66. Such components permit the battery system 40 to transition between different operating modes and charging modes.

For example, the energy pack 62 is selectively connectable to the DC-DC converter 64 and the bus 80 by a main energy pack switch 84 (K2), which selectively connects the energy pack 62 to the positive side of the bus 80. A pre-charge circuit 86 includes a bypass resistor 90 connected in series with a switch 88 (K1), also referred to as an "energy pack pre-charge switch" 88.

The propulsion pack 44 is selectively connectable to the DC-DC converter 64 (at the end 64b) by a main propulsion pack switch 92 (K4), which selectively connects the propulsion pack 44 to the positive side of the bus 80. A pre-charge circuit 94 includes a bypass resistor 96 connected in series with a switch 98 (K3), also referred to as a "propulsion pack pre-charge switch" 98.

Any of the switches described may be any suitable type of switch. For example, the switches 82, 84 and 92 may be mechanical relays. One or more of the switches may be an electronic switch or solid state switching device. Any suitable solid state or electronic device may be employed as a switch. For example, switches can include solid state relays or transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (Sic) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

The DC-DC converter 64 is configured to step up or step down voltage, for example, when the supplemental battery pack 62 and/or the propulsion pack 44 is/are being charged. Voltage may also be stepped up or stepped down as desired when supplying power to loads.

In an embodiment, the DC-DC converter 62 is a bi-directional converter that can step up or step down in either direction. Such a converter is referred to as a bi-directional buck-boost converter 62 that can transmit power in both directions.

In an embodiment, the propulsion pack 44 and the energy pack 62 have the same or similar voltage ratings. In this embodiment, the propulsion pack 44 and the energy pack 62 can be charged simultaneously with a high charging rate (e.g., a DC fast charging rate) without being limited by power constraints of the DC-DC converter 64.

Figure 4:
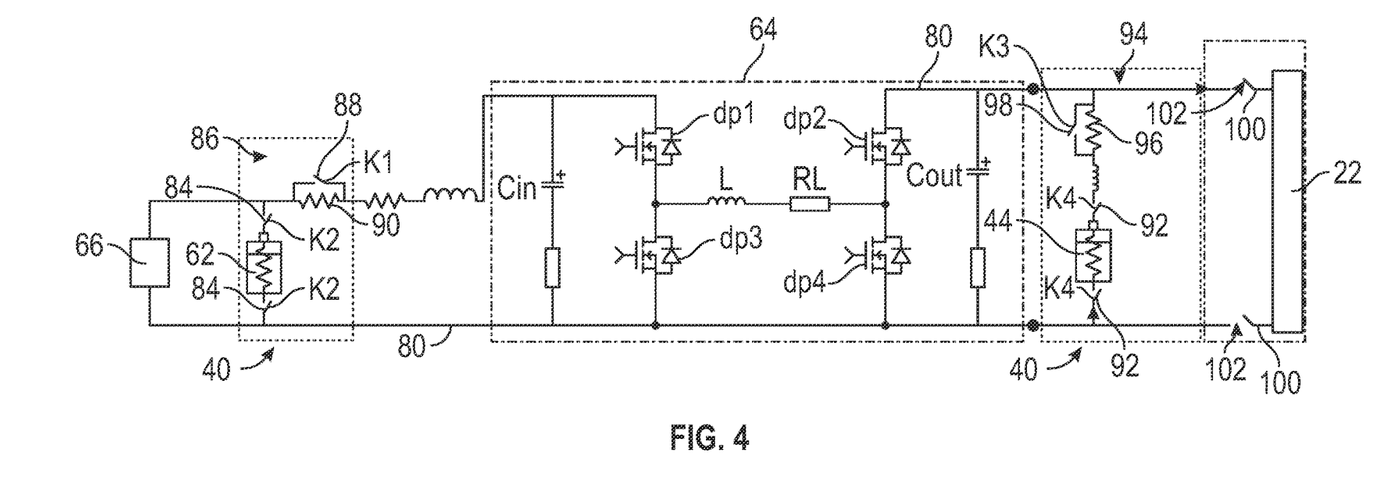
FIG. 4 depicts the charging system of FIG. 3, including components of a bi-directional buck-boost converter, in accordance with an exemplary embodiment.

FIG. 4 depicts an embodiment of the battery system 40 and the charging system, including a bi-directional buck-boost converter 64. The converter 64 includes a first half-bridge having switches dp1 and dp3, which are connected in parallel to a second half-bridge formed by switches dp2 and dp4. The half-bridges are connected by an inductor L having a resistance RL. A capacitor Cin is connected in parallel to the first half-bridge, and a capacitor Cout is connected in parallel to the second half-bridge.

In the embodiment of FIG. 4, the switch 84 (K2) includes a negative side switch and a positive side switch, and the switch 92 (K4) includes a negative side switch and a positive side switch.

As noted above, the mixed chemistry battery system 40 is configured for operation according to various operating modes and charging modes.

Figure 5:
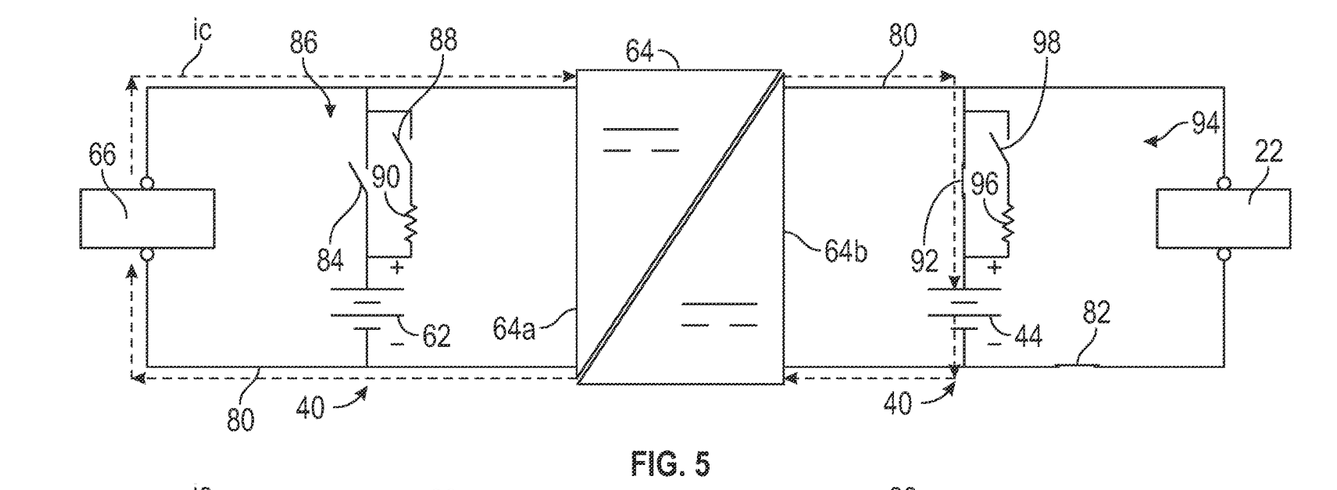
FIG. 5 depicts the charging system of FIG. 3 in a first charging mode, in accordance with an exemplary embodiment.

FIG. 5 depicts the battery system 40 and the charging system in a first charging mode, referred to as a "propulsion pack charge mode." In this mode, only the propulsion pack 44 (and any other propulsion battery packs, such as the battery pack 46) is charged, while the energy pack 62 is bypassed.

To put the vehicle 10 and the battery system into the propulsion pack charge mode, the main negative switch 82 and the main propulsion pack switch 92 are closed. The main energy pack switch 84 is open. As shown, when charging commences, a charging current ic (denoted by arrows) bypasses the energy pack 62 and flows through the DC-DC converter 64 and the propulsion pack 44.

Figure 6:
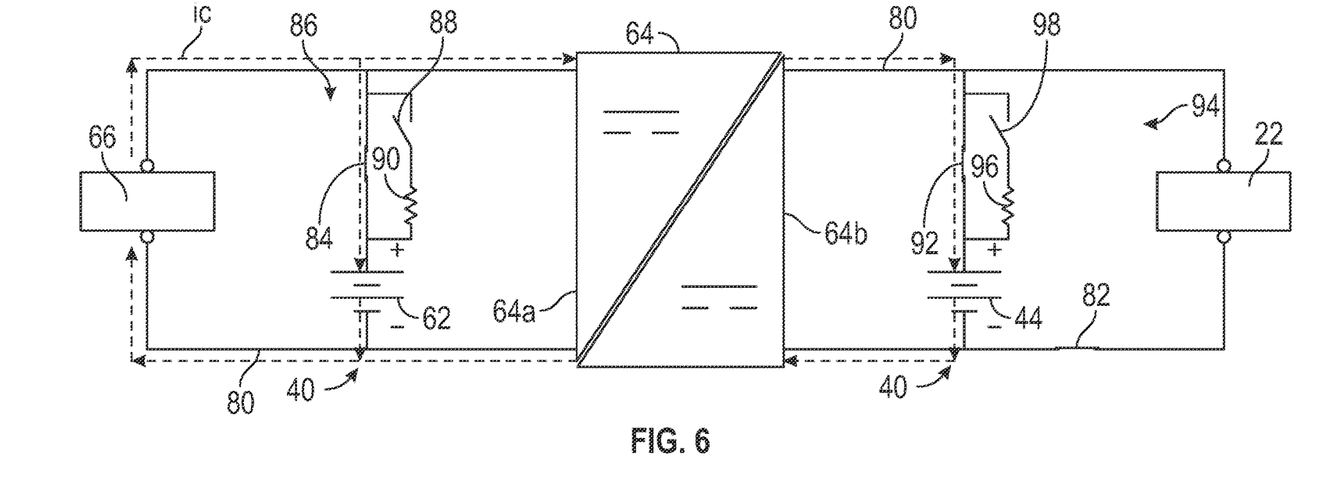
FIG. 6 depicts the charging system of FIG. 3 in a second charging mode, in accordance with an exemplary embodiment.

FIG. 6 depicts the battery system 40 and the charging system in a second charging mode, referred to as a "combined charge mode." In this mode, both the energy pack 62 and the propulsion pack 44 are electrically connected to the charging bus 80.

To put the vehicle 10 and the battery system into the combined charge mode, the main negative switch 82, the main propulsion pack switch 92 and the main energy pack switch 84 are all closed. When charging commences, a charging current ic simultaneously flows through the energy pack 62, the DC-DC converter 64 and the propulsion pack 44. In this way, the packs are charged simultaneously with the same voltage.

In addition to charging modes, the battery system 40 can be put into various operating modes or propulsion modes. The operating modes include, for example, a normal propulsion mode, a range assist mode, a power assist mode, and various charging modes.

In the normal propulsion mode, the switch 84 is open, and the switch 92 is closed, thereby disconnecting the energy pack 62 from the charging bus 80. The switch 92 is closed, and the propulsion pack 44 operates normally to provide power for propulsion and/or supply power to other loads. For example, in the normal propulsion mode, the battery system 40 provides three-phase AC current to a vehicle propulsion system via a propulsion bus 100 as shown in FIG. 4 (and conversion devices such as a DC-DC converter and an inverter (not shown)). One or more propulsion bus switches 102 may be included to allow the propulsion system and/or other loads to be selectively connected to the charging bus 80.

In the power assist mode, both the battery pack 44 and the supplemental battery pack 62 are connected to the bus 80 (switches 94 and 92 are closed). The battery pack 62 provides additional energy for propulsion, for example when a driver requests additional power.

Figure 7:
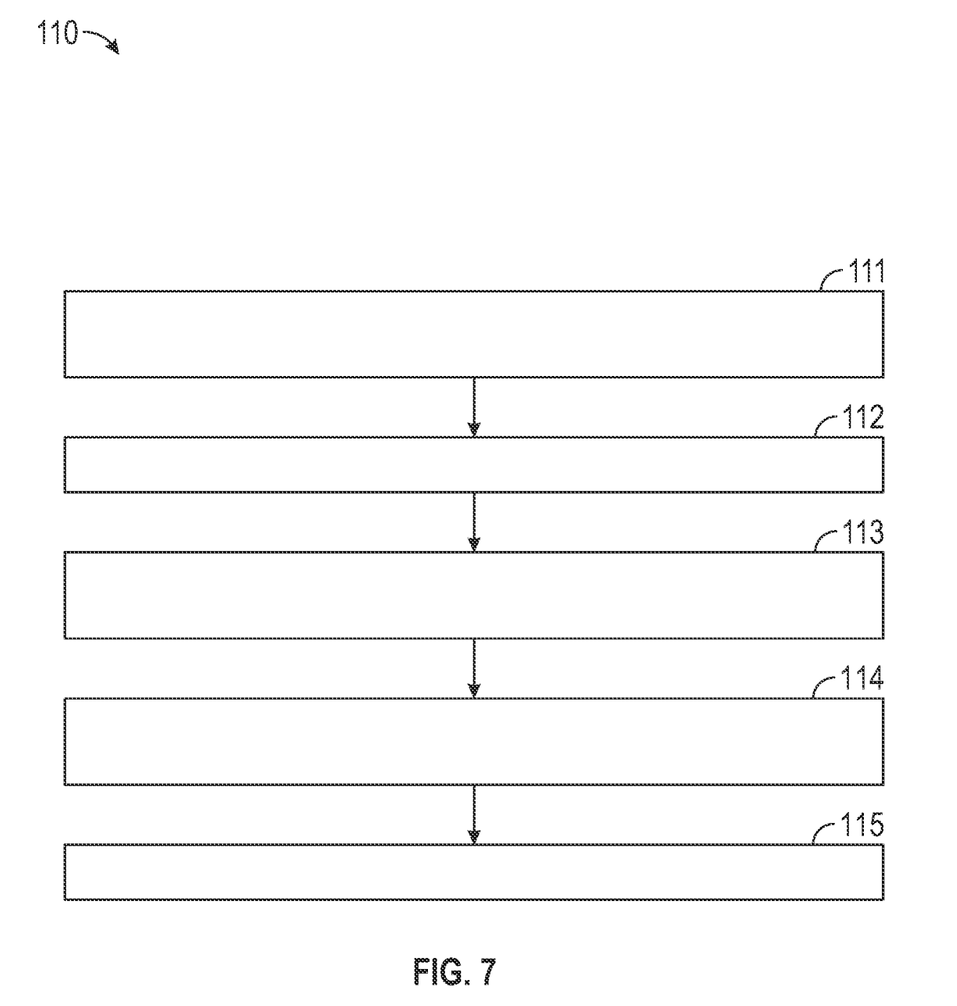
FIG. 7 is a flow diagram depicting aspects of a method of controlling a charging process for a mixed chemistry battery system, in accordance with an exemplary embodiment.

FIG. 7 depicts an embodiment of a method 110 of transferring power among and/or from battery systems having different chemistries. Aspects of the method 110 may be performed by a processor or processors disposed in a vehicle, such as the charger 66. It is noted the method 110 is not so limited and may be performed by any suitable processing device or system, or combination of processing devices.

The method 110 includes a number of steps or stages represented by blocks 111-115. The method 110 is not limited to the number or order of steps therein, as some steps represented by blocks 111-115 may be performed in a different order than that described below, or fewer than all of the steps may be performed.

The method 110 is described in conjunction with the vehicle 10 of FIG. 1 and the topology of FIG. 3 for illustration purposes. The method 100 is not so limited and can be used with any suitable vehicle battery system and any suitable mixed chemistry battery system.

At block 111, the vehicle 10 is connected to an energy source, such as a charging station, another vehicle battery or an electrical grid. In an embodiment, the vehicle 10 is connected to a fixed or mobile charging station, which may be configured for DC fast charging (DCFC).

A processing device such as the charger 66 receives a request for power transfer from the charging station (or other energy source). The request may be provided via a wireless communication or through a charging cable connecting the charge port 68 to an appropriate port or interface of the charging station. The charger 66 determines various power transfer parameters, such as load requirements and/or charging parameters.

At block 112, the charger 66 controls components of the charging system to put the charging system and the battery systems into a selected charging mode. For example, the charger 66 controls the switch 84 and/or 86 to put the charging system into a first mode as discussed with reference to FIG. 5, or a second charging mode as discussed in conjunction with FIG. 6.

At block 113, a charging process is initiated, and a charging current is supplied to the energy pack 62 and/or the propulsion pack 44. For example, depending on the selected charging mode, the propulsion pack 44 is charged while bypassing the energy pack 62, or the propulsion pack 44 and the energy pack 62 are charged simultaneously. In another example, the energy pack 62 can be charged without charging the propulsion pack 44, by charging while the switch 92 is open and the switch 84 is closed.

At block 114, various measurements are performed to monitor the progress of charging and to monitor battery conditions. Examples of such measurements include current, voltage and temperature. The monitoring also includes monitoring state of charge (SOC). When a desired SOC has been reached, the charging process ends.

At block 115, the vehicle 10 is disconnected from the charging station. The battery system 40 is then put into a propulsion mode or operating mode. The operating mode may be a normal propulsion mode, a range assist mode, or a power assist mode as discussed herein.

Figure 8:
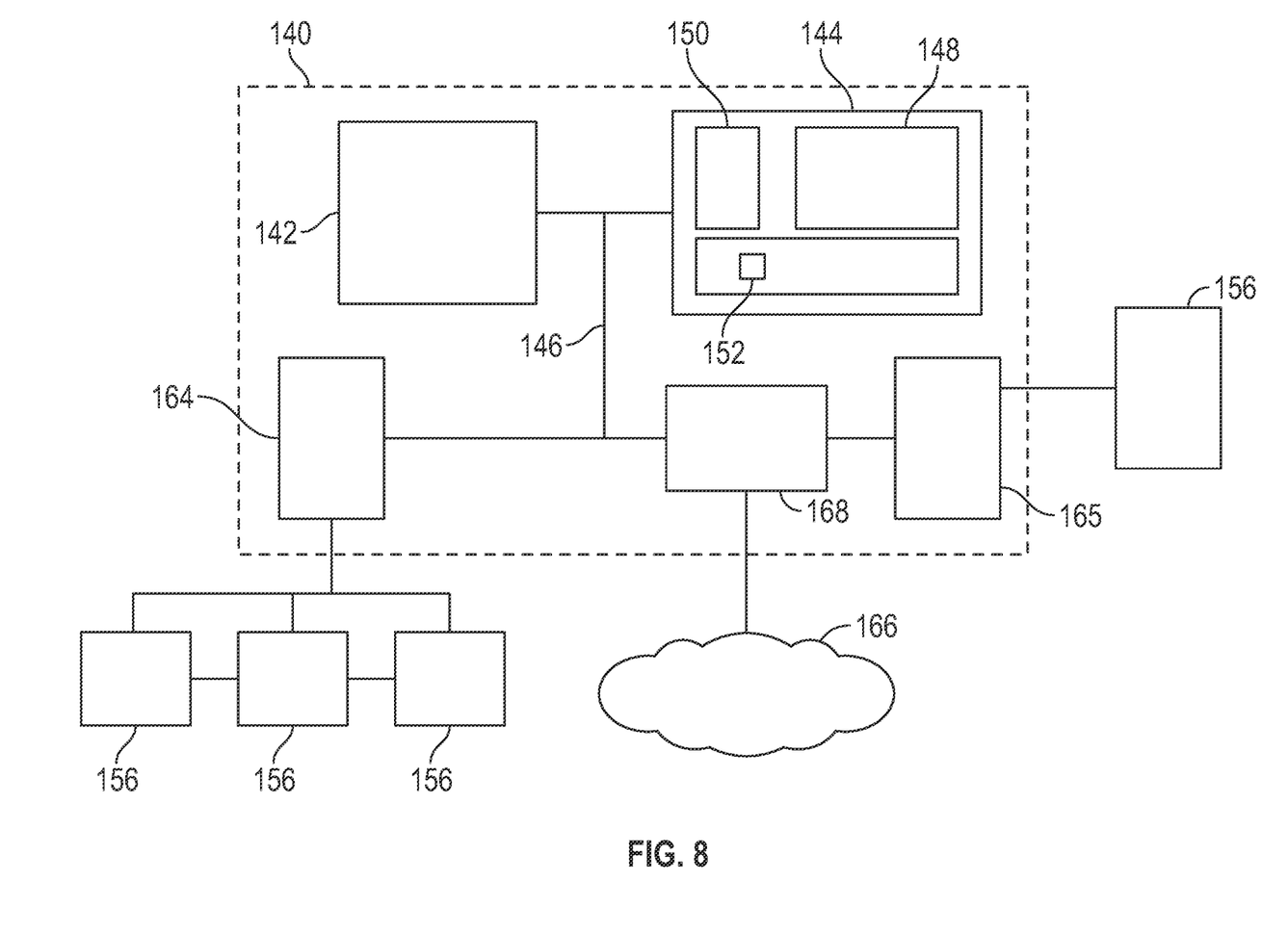
FIG. 8 depicts a computer system in accordance with an exemplary embodiment.

FIG. 8 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions related to control of power transfer as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 140. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for controlling power transfer, comprising:
a direct current (DC)-DC converter connected to a charging bus and selectively connected to a propulsion battery assembly and a supplemental battery assembly, the propulsion battery assembly having a first chemistry and configured to supply power to an electric motor of a vehicle, the supplemental battery assembly having a second chemistry that is different than the first chemistry; and
a charger connected to the charging bus at a first side of the DC-DC converter, the charging bus connected to a load at a second side of the DC-DC converter; and
a controller configured to control the DC-DC converter to perform a charging operation.

2. The system of claim 1, wherein the DC-DC converter is a bi-directional buck-boost converter.

3. The system of claim 1, wherein the propulsion battery assembly and the supplemental battery assembly are connected to the charging bus at opposing sides of the DC-DC converter.

4. The system of claim 1, wherein the supplemental battery assembly is a high energy battery assembly having an energy density that is greater than an energy density of the propulsion battery assembly.

5. The system of claim 1, further comprising a switching system controllable by the controller to put the system into a charging mode.

6. The system of claim 5, wherein the switching system includes a first switch disposed between the propulsion battery assembly and the charging bus, and a second switch disposed between the supplemental battery assembly and the charging bus.

7. The system of claim 6, wherein the controller is configured to put the system into a first charging mode by closing the first switch and opening the second switch, the first charging mode causing a charging current to bypass the supplemental battery assembly and charge the propulsion battery assembly through the DC-DC converter.

8. The system of claim 6, wherein the controller is configured to put the system into a second charging mode by closing the first switch and closing the second switch, the second charging mode causing a charging current to charge the supplemental battery assembly and the propulsion battery assembly simultaneously.

9. The system of claim 1, wherein the controller is configured to connect the supplemental battery assembly in parallel to the propulsion battery assembly during vehicle propulsion, and provide an electrical charge to the propulsion battery assembly through the DC-DC converter to extend a range of the vehicle.

10. The system of claim 1, wherein the controller is configured to connect the supplemental battery assembly in parallel to the propulsion battery assembly during vehicle propulsion, and provide electrical power to the electric motor through the DC-DC converter, the electrical power bypassing the propulsion battery assembly.

11. A method of controlling power transfer, comprising:
receiving a charging request at a controller of a charging system, the charging system including a DC-DC converter connected to a charging bus and selectively connected to a propulsion battery assembly and a supplemental battery assembly, the propulsion battery assembly having a first chemistry and configured to supply power to an electric motor of a vehicle, the supplemental battery assembly having a second chemistry that is different than the first chemistry, the charging system including a charger connected to the charging bus at a first side of the DC-DC converter, the charging bus connected to a load at a second side of the DC-DC converter; and perform a charging operation based on the charging request by controlling the DC-DC converter.

12. The method of claim 11, wherein the DC-DC converter is a bi-directional buck-boost converter.

13. The method of claim 11, wherein the charging system includes a switching system controllable by the controller to put the charging system into a charging mode.

14. The method of claim 13, wherein the switching system includes a first switch disposed between the propulsion battery assembly and the charging bus, and a second switch disposed between the supplemental battery assembly and the charging bus.

15. The method of claim 14, wherein performing the charging operation includes putting the charging system into a first charging mode by closing the first switch and opening the second switch, the first charging mode causing a charging current to bypass the supplemental battery assembly and charge the propulsion battery assembly through the DC-DC converter.

16. The method of claim 14, wherein performing the charging operation includes putting the charging system into a second charging mode by closing the first switch and closing the second switch, the second charging mode causing a charging current to charge the supplemental battery assembly and the propulsion battery assembly simultaneously.

17. A vehicle system comprising:
a DC-DC converter connected to a charging bus and selectively connected to a propulsion battery assembly and a supplemental battery assembly, the propulsion battery assembly having a first chemistry and configured to supply power to an electric motor of a vehicle, the supplemental battery assembly having a second chemistry that is different than the first chemistry; and
a charger connected to the charging bus at a first side of the DC-DC converter, the charging bus connected to a load at a second side of the DC-DC converter; and
a controller configured to control the DC-DC converter to perform a charging operation.

18. The vehicle system of claim 17, wherein the supplemental battery assembly is a high energy battery assembly having an energy density that is greater than an energy density of the propulsion battery assembly.

19. The vehicle system of claim 17, further comprising a switching system controllable by the controller to put the vehicle system into a charging mode, the switching system including a first switch disposed between the propulsion battery assembly and the charging bus, and a second switch disposed between the supplemental battery assembly and the charging bus.

20. The vehicle system of claim 19, wherein the controller is configured to put the system into a first charging mode by closing the first switch and opening the second switch, the first charging mode causing a charging current to bypass the supplemental battery assembly and charge the propulsion battery assembly through the DC-DC converter, and the controller is configured to put the system into a second charging mode by closing the first switch and closing the second switch, the second charging mode causing a charging current to charge the supplemental battery assembly and the propulsion battery assembly simultaneously.

* * * * *